(12) United States Patent
Takaiwa (10) Patent No.: US 8,269,846 B2
(45) Date of Patent: Sep. 18, 2012

(54) IMAGING APPARATUS AND CONTROL METHOD CONFIGURED TO AUTHENTICATE A USER

(75) Inventor: Kan Takaiwa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 11/455,480

(22) Filed: Jun. 19, 2006

(65) Prior Publication Data

US 2006/0290790 A1 Dec. 28, 2006

(30) Foreign Application Priority Data

Jun. 28, 2005 (JP) ................................. 2005-188087

(51) Int. Cl.
 *H04N 5/232* (2006.01)
 *H04N 5/225* (2006.01)
 *H04N 5/222* (2006.01)
(52) U.S. Cl. ............ 348/211.2; 348/207.99; 348/333.13
(58) Field of Classification Search .................. 348/143, 348/161, 207.1, 211.99, 231.99, 272, 207.99, 348/333.13
See application file for complete search history.

(56) References Cited

U.S. PATENT DOCUMENTS

| | | | | |
|---|---|---|---|---|
| 6,567,122 B1 * | 5/2003 | Anderson et al. | .......... | 348/211.3 |
| 6,980,234 B2 * | 12/2005 | Kitawaki | ................... | 348/207.1 |
| 7,215,793 B2 * | 5/2007 | Takahashi | ..................... | 382/100 |
| 7,355,632 B2 * | 4/2008 | Shiiyama | ................... | 348/211.1 |
| 7,379,095 B2 * | 5/2008 | Kondoh | ..................... | 348/211.1 |
| 7,454,194 B2 * | 11/2008 | Kuwajima | ..................... | 455/411 |
| 2002/0008143 A1 * | 1/2002 | Bridgelall | ................ | 235/462.13 |
| 2002/0048460 A1 * | 4/2002 | Kitawaki | ..................... | 396/429 |
| 2003/0235326 A1 | 12/2003 | Morikawa et al. | | |
| 2004/0069851 A1 * | 4/2004 | Grunes et al. | .................. | 235/435 |
| 2004/0087273 A1 * | 5/2004 | Perttila et al. | ................ | 455/41.2 |
| 2004/0174435 A1 * | 9/2004 | Kondoh | ................... | 348/211.99 |
| 2005/0012824 A1 * | 1/2005 | Stavely et al. | ........... | 348/211.99 |
| 2005/0071647 A1 * | 3/2005 | Fujinuma et al. | ............. | 713/186 |
| 2005/0154919 A1 * | 7/2005 | Noguchi et al. | .............. | 713/201 |
| 2005/0160138 A1 | 7/2005 | Ishidoshiro | | |
| 2005/0211780 A1 * | 9/2005 | Tanaka | ..................... | 235/462.15 |
| 2005/0279833 A1 * | 12/2005 | Tanaka | ..................... | 235/462.46 |
| 2006/0104483 A1 * | 5/2006 | Harel et al. | .................... | 382/115 |
| 2006/0187309 A1 * | 8/2006 | Ban et al. | ..................... | 348/211.2 |
| 2006/0237427 A1 * | 10/2006 | Logan | ........................... | 219/401 |

FOREIGN PATENT DOCUMENTS

| | | |
|---|---|---|
| EP | 1003069 A2 | 5/2000 |
| JP | 2000-147623 A | 5/2000 |
| JP | 2001-045358 A | 2/2001 |
| JP | 2002-165271 A | 6/2002 |
| JP | 2004-23733 A | 1/2004 |
| JP | 2004-220421 A | 8/2004 |
| JP | 2004-312263 A | 11/2004 |
| JP | 2005-020398 A | 1/2005 |
| JP | 2005-027135 A | 1/2005 |
| JP | 2005-057416 A | 3/2005 |
| JP | 2005-142907 A | 6/2005 |
| JP | 2005-157593 A | 6/2005 |

* cited by examiner

*Primary Examiner* — Nhan T Tran
*Assistant Examiner* — Tuan Le
(74) *Attorney, Agent, or Firm* — Canon USA Inc. IP Division (57) ABSTRACT

An imaging apparatus includes a registration unit configured to register an ID tag, a detection unit configured to detect an ID tag within a detection area and a determination unit configured to determine if the ID tag detected by the detection unit is registered. The imaging apparatus further includes a operation member configured to execute a predetermined operation, and a control unit configured to prevent execution of the predetermined operation even if the operation member is operated, in cases where the ID tag detected by the detection unit is not registered in the registration unit.

12 Claims, 8 Drawing Sheets

IMAGING APPARATUS AND CONTROL METHOD CONFIGURED TO AUTHENTICATE A USER

BACKGROUND OF THE INVENTION

1. Field of the Invention

The present invention relates to an imaging apparatus and a method thereof for making personal authentication possible.

2. Description of the Related Art

Conventionally, various methods have been proposed for identifying a user who is authorized to use an apparatus by, for example, processing a personal identification number (PIN) or biological information such as, fingerprints, iris patterns, etc provided by the user.

Conventional authentication methods employing PIN numbers typically require users to input a predetermined PIN by using a ten-key pad with which an apparatus is equipped, or input the predetermined PIN by operating one or more switches multiple-times in an apparatus which cannot be equipped with the ten-key pad.

One conventional authentication method employing biological information is mentioned in Japanese Laid-open No. 2004-23733, which discloses an apparatus equipped with a fingerprint scanner or a camera to input the iris patterns. The apparatus described in the above-mentioned patent document performs a personal identification of a user by comparing the biological information input from the scanner or the camera with the personal information registered in the apparatus.

However, a fundamental problem associated with an authentication method to verify an authorized user by input of the PIN is that it may be comparatively easy for another person to pose as the authorized user by way of stealing, counterfeiting or obtaining leakage of information, etc. An authentication method using the biological information necessitates a cumbersome task of acquiring a fingerprint image or an eyeball image in order to obtain the iris pattern. Also, another disadvantage associated with the biological information authentication method is that the acquisition of the biological information may be affected greatly by the condition of the photographer and surroundings at the time. When the biological information is acquired, acceptable biological information may not necessarily be obtained. Therefore such authentication method may require the user to spend a long time and deal with cumbersome operations in order to input the necessary biological information.

SUMMARY OF THE INVENTION

In view of the above problems in the conventional art, embodiments of the present invention provide an imaging apparatus and a method which can acquire information of a user for the purpose of verifying personal authentication easily, without requiring cumbersome information to be input by the user.

According to an aspect of the present invention, an imaging apparatus includes a registration unit configured to register an ID tag, a detection unit configured to detect an ID tag within a detection area, and a determination unit configured to determine if the ID tag detected by the detection unit is registered. The imaging apparatus further includes an operation member (e.g., a shutter button) configured to execute a predetermined operation (e.g., photographing operation), and a control unit configured to prevent execution of the predetermined operation even if the operation member is operated, in cases where the ID tag detected by the detection unit is not registered in the registration unit.

According to another aspect of the present invention, an imaging apparatus includes an imaging unit configured to obtain an object image and a storage unit configured to store image data of the object image obtained by the imaging unit. The imaging apparatus further includes a registration unit configured to register a ID tag, a detection unit configured to detect an ID tag within a detection area, and a determination unit configured to determine if the ID tag detected by the detection unit is registered in the registration unit. Also included in the imaging apparatus is a control unit configured to control the storage unit to store information regarding the ID tag detected by the detection unit associated with the image data, in cases where the ID tag detected by the detection unit is registered in the registration unit.

According to yet another aspect of the present invention, an imaging apparatus includes a registration unit configured to register an ID tag, a detection unit configured to detect an ID tag within a detection area, and a determination unit configured to determine if the ID tag detected by the detection unit is registered in the registration unit. The imaging apparatus further includes a control unit configured to control driving power of the imaging apparatus to change to a second driving power from a first driving power if the registered tag is not detected within a defined time period, wherein the second driving power is lower than the first driving power.

Further features of the present invention will become apparent from the following description of exemplary embodiments (with reference to the attached drawings).

DESCRIPTION OF THE EMBODIMENTS

Exemplary embodiments of the invention are described in detail below with reference to the accompanying drawings. The relative layout of constituent elements exemplified in the embodiments should appropriately be changed in accordance with the arrangement and conditions of the apparatus to which the present invention is applied. The present invention is not limited to these illustrative embodiments. An apparatus which combined a plurality of embodiments described below is also included in the present invention.

First Exemplary Embodiment

Figure 1:
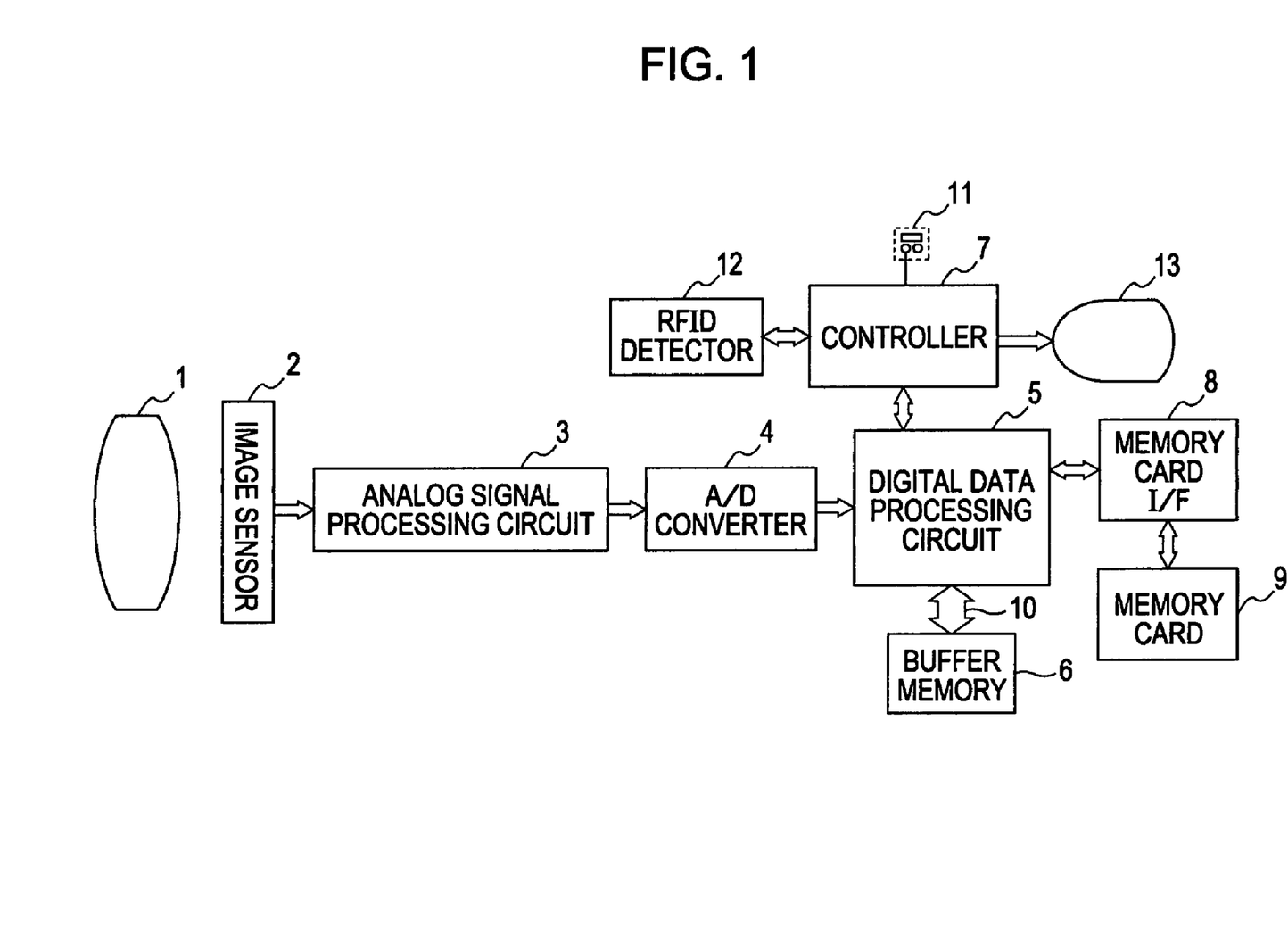
FIG. 1 is an exemplary block diagram illustrating an exemplary arrangement of an electronic camera in a first embodiment of the present invention.

FIG. 1 is an exemplary block diagram illustrating an exemplary arrangement of an electronic camera in a first embodiment of the present invention. In FIG. 1, the electronic camera includes a lens 1, an image sensor 2, an analog signal processing circuit 3 which processes an analog signal obtained by the image sensor 2, an A/D converter 4 which converts the analog signal into digital data, a digital data processing circuit 5 which processes the digital data converted by the A/D converter 4, a buffer memory 6, a controller 7 which controls each circuit and includes a registration unit which has a function to register a plurality of arbitrary RFID (radio frequency identification) tags beforehand, a memory card I/F (interface) 8, a memory card 9 which is a storage medium which is detachably provided to the main body of the camera, a memory bus 10, a shutter button (release button) 11, a RFID detector 12 which detects whether there is any RFID tag within a detection area, and a display 13. In exemplary embodiments, the RFID tag employed by the electric camera is a non-contact type ID tag. However, it is noted that embodiments of the present invention are not limited to use with a non-contact type ID tag.

An exemplary processing operation of the electronic camera is described below with reference to FIG. 1.

When the shutter button 11 is operated, electric power source is supplied to the RFID detector 12. Then, the RFID detector 12 detects whether there is any RFID tag (not shown) within a predetermined detection area.

The RFID tag is preferably carried by the user. For example, in one embodiment, the RFID tag is incorporated within an ID badge which the user can put on. In cases where the distance from which the RFID detector 12 can detect the RFID tag is several ten centimeters or less, for example, in another embodiment, the RFID tag is incorporated within a wristband preferably worn on the dominant hand of the user which operates the shutter button 11 of the camera. By carrying the RFID tag as described above, the RFID tag detection by the RFID detector 12 can be performed with accuracy.

In cases where the RFID tag is detected within the detection area, it is determined whether the detected RFID tag is registered in the controller 7. In cases where the detected RFID tag is registered, photographing operation is started. That is, the object image by which the image-formation is performed on the image sensor 2 with the lens 1 is converted into an electrical signal by the image sensor 2. The electrical signal is performed a predetermined process by the analog signal processing circuit 3. Then, the processed electrical signal is converted into the digital data by the A/D converter 4.

The digital data converted by the A/D converter 4 is performed predetermined pre-process, and then the pre-processed digital data is temporarily stored in the buffer memory 6. The digital data is read from the buffer memory when the memory bus 10 is not busy. Then, the read digital data is predetermined developing-processed by the digital data processing circuit 5 to output digital image data. The digital image data is again stored in the buffer memory 6.

The digital image data stored in the buffer memory 6 is read with the memory card I/F 8, and is written in the memory card 9. Each above-described operation is suitably controlled by the controller 7.

Figure 2:
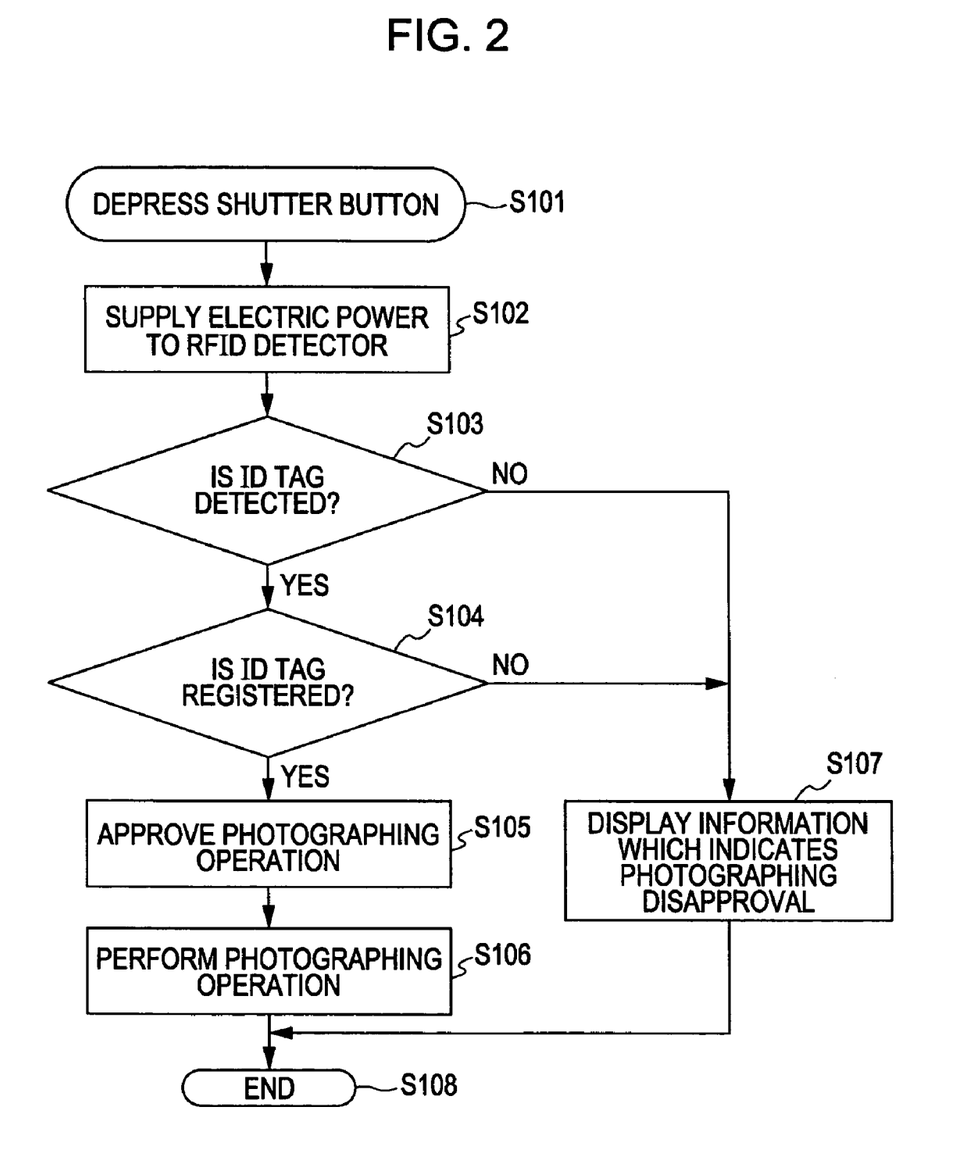
FIG. 2 is a flowchart illustrating exemplary processing operation of an electronic camera in a first embodiment.

FIG. 2 is a flowchart illustrating exemplary processing operation of the electronic camera in the first embodiment.

When the shutter button 11 is operated by a user, the processing starts (step S101). In response to the user operating the shutter button, the electric power source is supplied to the RFID detector 12 (step S102). Next, the RFID detector 12 detects whether there is any RFID tag within the detection area (step S103). Since the power is supplied to the RFID detector 12 when the predetermined operating member (the shutter button 11 in this embodiment) is operated and the RFID detector 12 starts the operation, the increase in electric power consumption by the RFID detector 12 can be minimized.

If the RFID tag is detected within the detection area (yes in step S103), it is determined whether the detected RFID tag is registered in the controller 7 (step S104). If the detected RFID tag is registered in the controller 7 (yes in step S104), photographing operation is approved for the user (step S105). Next, in step S166, the above-described photographing operation is performed. After the completion of the photographing operation, the flow proceeds to step S108 where the processing ends.

On the other hand, if the RFID tag is not detected within the detection area (no in step S103) or the detected RFID tag is not registered in the controller 7 (no in step S104), the display 13 displays information which indicates photographing disapproval (step S107). The processing then ends in step S108 without performing the photographing operation.

Thus, according to this embodiment, since the personal authentication in the electronic camera is performed by determining whether the RFID tag detected by the RFID detector 12 is registered, the personal authentication can be performed easily without requiring cumbersome user input operations, irrespective of a photographing condition.

Furthermore, since the photographing operation is made impossible in cases where the RFID tag is not detected or the detected RFID tag is not registered in the apparatus, the photographing operation by users other than the authenticated user can be prohibited.

Second Exemplary Embodiment

Figure 3:
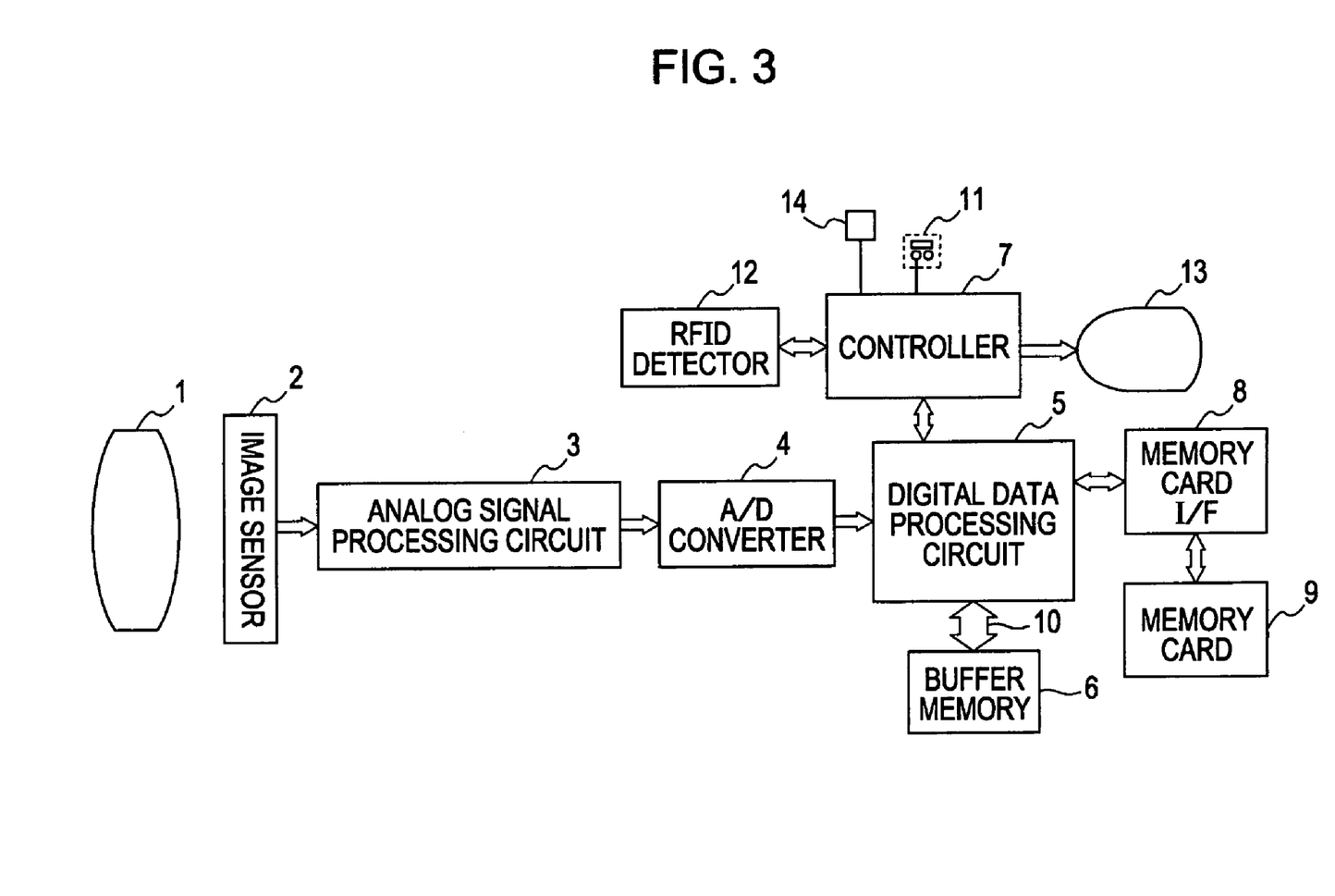
FIG. 3 is an exemplary block diagram illustrating an exemplary arrangement of an electronic camera in a second embodiment of the present invention.

FIG. 3 is an exemplary block diagram illustrating an exemplary arrangement of an electronic camera in a second embodiment of the present invention. Components of the second embodiment (shown in FIG. 3) that have the same or similar function as components of the first embodiment (shown in FIG. 1 and described above) have the same reference number, and descriptions thereof are not repeated here. In FIG. 3, the electronic camera includes a camera mode setting unit 14 which includes mode setting buttons etc.

An exemplary processing operation of the electronic camera is described below with reference to FIG. 3.

The processing of photographing operation which starts with an operation of the shutter button 11 is the same as that of the first embodiment (see the flowchart in FIG. 2). Also when the camera mode setting unit 14 is also operated, electric power is supplied to the RFID detector 12. Then, the RFID detector 12 detects whether there is any RFID tag (not shown) within a predetermined detection area.

The RFID tag is preferably carried by the user. For example, in one embodiment, the RFID tag is built into an ID badge which the user can put on. In cases where the distance from which the RFID detector 12 can detect the RFID tag is several ten centimeters or less, for example, in another embodiment, the RFID tag is built into a wristband preferably worn on the dominant hand of the user which operates the shutter button 11 or the camera mode setting unit 14 of the camera. By carrying the RFID tag as described above, the RFID tag detection by the RFID detector 12 can be performed with accuracy.

In cases where the RFID tag is detected within the detection area, it is determined whether the detected RFID tag is registered in the controller 7. In cases where the detected RFID tag is registered, setting operation of the camera mode setting unit is approved and a setup in various modes of the camera approval is enabled.

Figure 4:
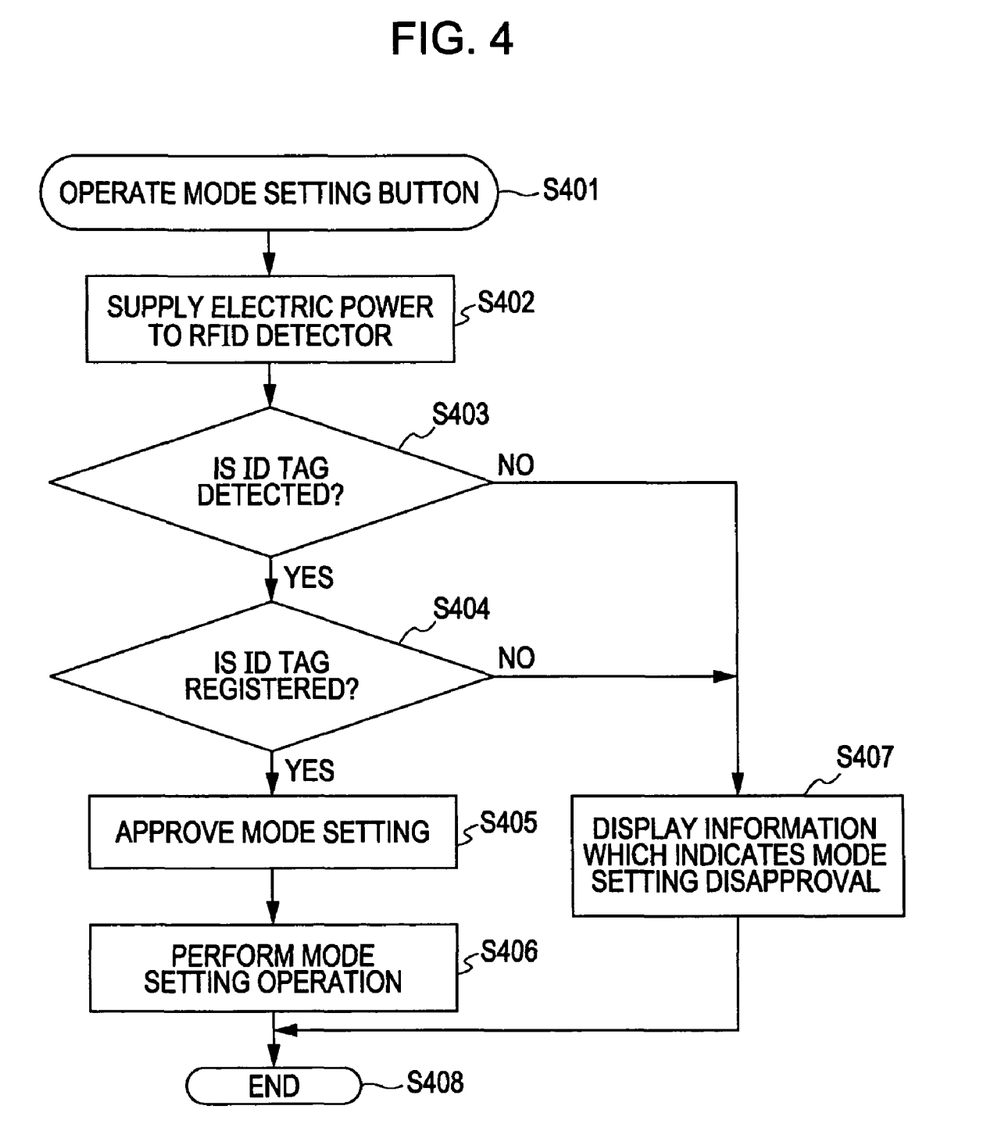
FIG. 4 is a flowchart illustrating exemplary processing operation of an electronic camera in a second embodiment.

FIG. 4 is a flowchart illustrating exemplary processing operation of the electronic camera in the second embodiment.

When the mode setting button of the camera mode setting unit 14 is operated by a user, the processing starts (step S401). In response to the user operating the camera mode setting unit 14, the electric power source is supplied to the RFID detector 12 (step S402). Next, the RFID detector detects whether there is any RFID tag within the detection area (step S403). Since the electric power is supplied to the RFID detector 12 when the predetermined operating member (the camera mode setting unit 14 in this embodiment) is operated and the RFID detector 12 starts the operation, the increase in electric power consumption by the RFID detector 12 can be minimized.

If the RFID tag is detected within the detection area (yes in step S403), it is determined whether the detected RFID tag is registered in the controller 7 (step S404). If the detected RFID tag is registered in the controller 7 (yes in step S404), camera mode setting operation is approved for the user (step S405). Next, in step S406, the camera mode setting operation is performed (step S406). After the completion of the camera mode setting operation, the flow proceeds to step S408 where the processing ends.

On the other hand, if the RFID tag is not detected within the detection area (no in step S403) or the RFID tag is not registered in the controller 7 (no in step S404), the display 13 displays information which indicates the camera mode setting disapproval (step S407). The processing then ends in step S408 without performing the camera mode setting operation.

Thus, according to this embodiment, since the camera mode setting operation is made impossible in cases where the RFID tag is not detected or the detected RFID tag is not registered in the apparatus, the camera mode setting operation by users other than the authenticated user can be prohibited.

Third Exemplary Embodiment

The components of an electronic camera of the third embodiment are the same as or similar to that of the electronic camera of the first embodiment. As such, an exemplary processing operation of the electronic camera in the third embodiment is described below with reference to FIG. 1. When the shutter button 11 is operated, electric power source is supplied to the RFID detector 12. Then, the RFID detector 12 detects whether there is any RFID tag (not shown) within a detection area.

The RFID tag is preferably carried by the user. For example, in one embodiment, the RFID tag is built into an ID badge which the user can put on. In cases where the distance from which the RFID detector 12 can detect the RFID tag is several ten centimeters or less, for example, in another embodiment, the RFID tag is built into a wristband preferably worn on the dominant hand of the user which operates the shutter button 11 of the camera. By carrying the RFID tag as described above, the RFID tag detection by the RFID detector 12 can be performed with accuracy.

In cases where the RFID tag is detected within the detection area, it is determined whether the detected RFID tag is registered in the controller 7. In the third embodiment, the photographing operation is started regardless of whether the detected RFID tag is registered in the apparatus. That is, the object image by which the image-formation is performed on the image sensor 2 with the lens 1 is converted into an electrical signal by the image sensor 2. The electrical signal obtained by the image sensor 2 is processed by the analog signal processing circuit 3. Then, the processed electrical signal is converted into digital data by the A/D converter 4.

The digital data converted by the A/D converter 4 is performed predetermined pre-process, and then the pre-processed digital data is temporarily stored in the buffer memory 6. The digital data is read from the buffer memory when the memory bus 10 is not busy. Then, the read digital data is predetermined developing-processed by the digital data processing circuit 5 to output digital image data. The digital image data is again stored in the buffer memory 6.

The digital image data stored in the buffer memory 6 is read with the memory card I/F 8, and is written in the memory card. In cases where the detected RFID tag is registered in the controller 7, the image data is written in the memory card with predetermined user information, such as owner information etc., regarding the detected RFID tag. Each above-described operation is suitably controlled by the controller 7.

Thus, according to this embodiment, since the user information extracted from the detected RFID tag is stored in the memory card 9 to correspond with the image data, counterfeiting is difficult and reliability is enhanced.

Forth Exemplary Embodiment

The components of an electronic camera of the forth embodiment are the same as or similar to that of the electronic camera of the first embodiment. As such, an exemplary processing operation of the electronic camera in the forth embodiment is described below with reference to FIG. 1. When the shutter button 11 is operated, the controller 7 determines whether the registered RFID tag (not shown) was already detected by the RFID detector 12 within a predetermined time previous to the operation of the shutter button 11 (in other words, the controller 7 determines whether the operation of the shutter is performed within a predetermined time after the detection of the registered RFID tag).

The RFID tag is preferably carried by the user. For example, the RFID tag may be built into an ID badge which the user can put on. In cases where the distance from which the RFID detector 12 can detect the RFID tag is several ten centimeters or less, for example, the RFID tag may be built in a wristband preferably worn on the dominant hand of the user which operates the shutter button 11 of the camera. By carrying the RFID tag as described above, the RFID tag detection by the RFID detector 12 can be performed with accuracy.

In cases where the registered RFID tag was not detected within the predetermined time previous to the operation of the shutter button 11, electric power is supplied to the RFID detector 12. Then, the RFID detector 12 detects whether there is any RFID tag within the detection area.

In cases where the RFID tag is detected within the detection area, it is determined whether the detected RFID tag is registered in the controller 7. In cases where the RFID tag was detected within the predetermined time previous to the operation of shutter button 11 or the newly detected RFID tag is registered, photographing operation is stated. That is, the object image by which the image-formation is performed on the image sensor 2 with the lens 1 is converted into an electrical signal by the image sensor 2. The electrical signal obtained by the image sensor 2 is processed by the analog signal processing circuit 3. Then, the processed electrical signal is converted into digital data by the A/D converter 4.

The digital data converted by the A/D converter 4 is performed predetermined pre-process, and then the pre-processed digital data is temporarily stored in the buffer memory 5. The digital data is read from the buffer memory when the memory bus 10 is not busy. Then, the read digital data is predetermined developing-processed by the digital data processing circuit 5 to output digital image data. The digital image data is again stored in the buffer memory 6.

The digital image data stored in the buffer memory 6 is read with the memory card I/F 8, and is written in the memory card 9. Each above-described operation is suitably controlled by the controller 7.

Figure 5:
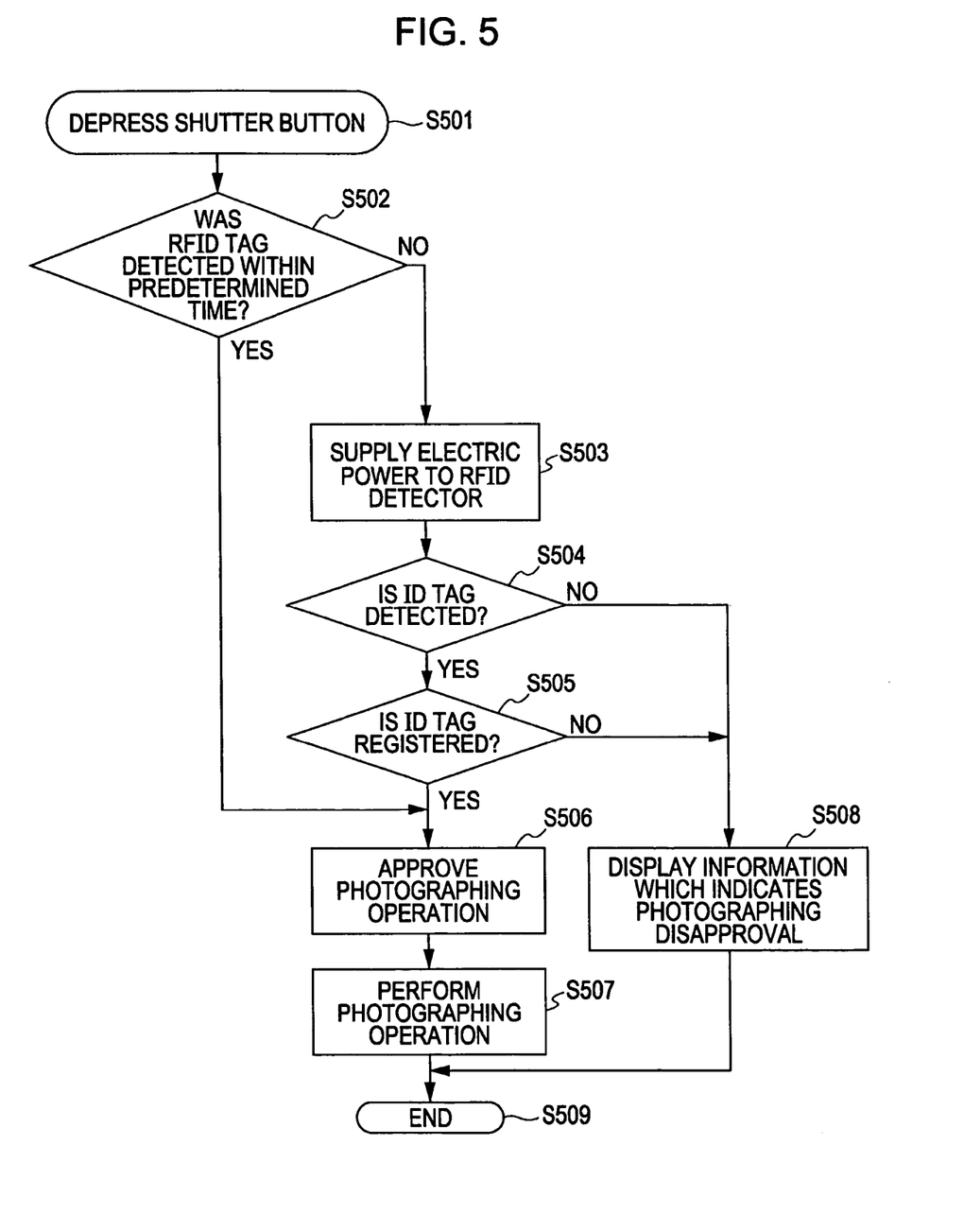
FIG. 5 is a flowchart illustrating exemplary processing operation of an electronic camera in a forth embodiment.

FIG. 5 is a flowchart illustrating exemplary processing operation of the electronic camera in the forth embodiment.

When the shutter button 11 is operated, the processing starts (step S501). It is determined whether the registered RFID tag was detected by the RFID detector 12 within the predetermined time previous to the operation of the shutter button 11 (step S502). If the registered RFID tag was detected within the predetermined time previous to the operation of the shutter button 11 (yes in the step S502), the processing proceeds to step S506 (described later). On the other hand, if the registered RFID tag was not detected within the predetermined time previous to the operation of the shutter button 11 (no in step S502), the electric power is supplied to the RFID detector 12 (step S503). Then, the RFID detector 12 detects whether there is any RFID tag within the detection area (step S504).

If the RFID tag is detected within the detection area (yes in step S504), it is determined whether the detected RFID tag is registered in the controller 7 (step S505). If the detected RFID tag is registered in the controller 7 (yes in step S505), the photographing operation is approved for the user (step S506). Next, in step S507, the above-described photographing operation is performed. After the completion of the photographing operation, the flow proceeds to step S509 where the processing ends.

If the registered RFID tag was not detected within the predetermined time previous to the operation of the shutter button 11 (no in the step S502), and the RFID tag is not detected within the detection area (no in step S504) or the RFID tag is not registered in the controller 7 (no in step S505), the display 13 displays information which indicates photographing disapproval (step S508). The processing then ends in step S509 without performing the photographing operation.

Thus, according to this embodiment, in cases where it is determined that the RFID tag detected by the RFID detector 12 is registered in the electronic camera, the electronic camera makes the photographing operation possible within the predetermined time period after the determination. Therefore, the photographing operation can be performed even if the user is distance from the electronic camera (for example, in a photographing condition which is picked-up by using a tripod, remote control, etc.).

Fifth Exemplary Embodiment

Figure 6:
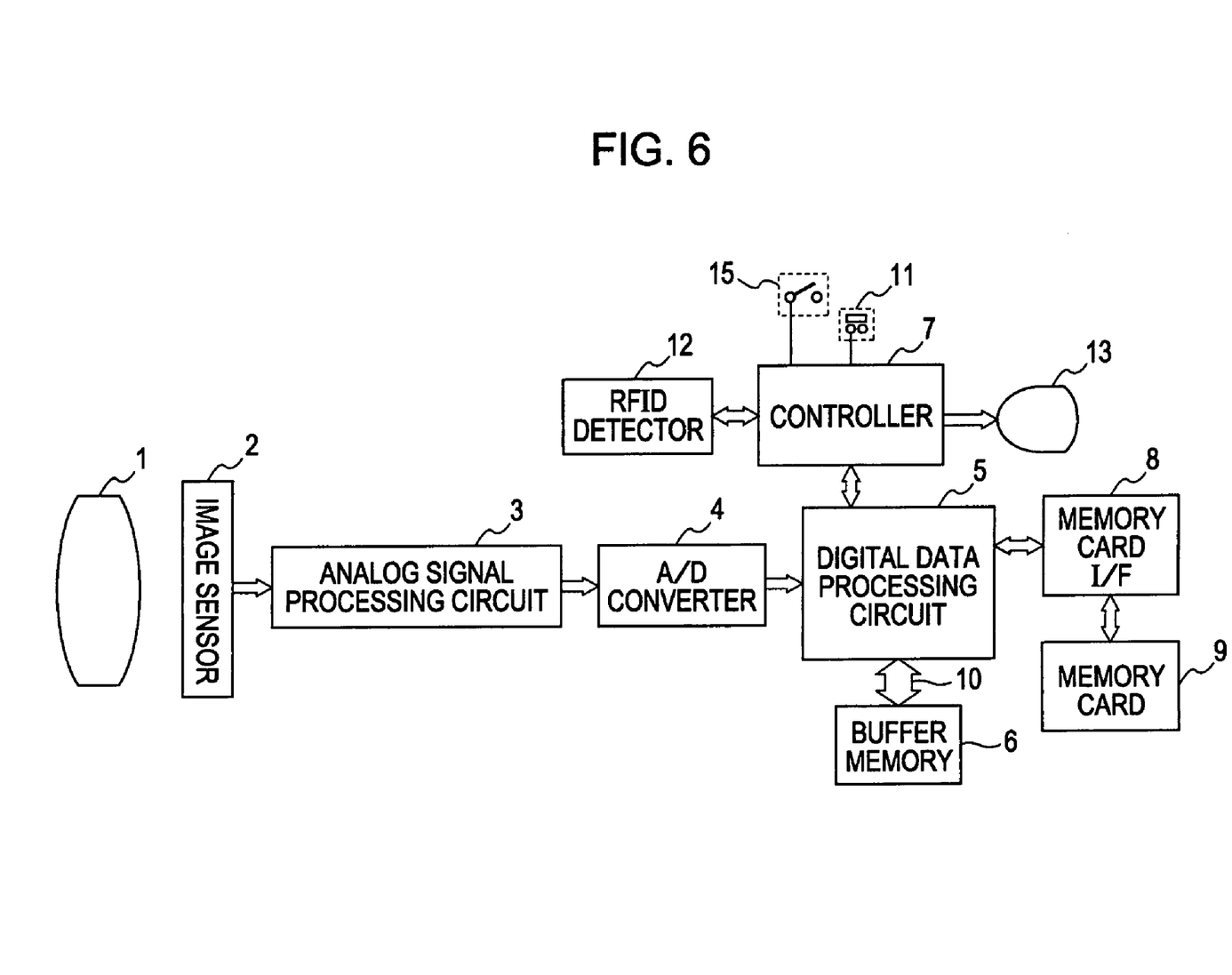
FIG. 6 is an exemplary block diagram illustrating an exemplary arrangement of an electronic camera in a fifth embodiment of the present invention.

FIG. 6 is an exemplary block diagram illustrating an exemplary arrangement of an electronic camera in the fifth embodiment of the present invention. Components of the fifth embodiment (shown in FIG. 6) that have the same or similar function as components of the first embodiment (shown in FIG. 1 and described above) have the same reference number, and descriptions thereof are not repeated here. In FIG. 6, the electronic camera includes a power switch 15.

An exemplary processing operation of the electronic camera is described below with reference to FIG. 6. The processing of photographing operation which starts with an operation of the shutter button 11 is the same as that of the first or forth embodiment (see the flowchart in FIG. 2 or FIG. 5).

When the power switch 15 is operated, the camera starts to work and the photographing operation is enabled. The controller 7 supplies electric power to the RFID detector 12 during a first period of time. Then, the RFID detector 12 detects whether there is any RFID tag (not shown) within the detection area.

The RFID tag is preferably carried by the user. For example, the RFID tag may be built in an ID badge which the user can put on. In cases where the distance from which the RFID detector 12 can detect the RFID tag is several ten centimeters or less, for example, the RFID tag may be built in a wristband preferably worn on the dominant hand of the user which operates the shutter button 11 of the camera. By carrying the RFID tag as described above, the RFID tag detection by the RFID detector 12 can be performed with accuracy.

In cases where the RFID tag is detected within the detection area, it is determined whether the detected RFID tag is registered in the controller 7. In cases where the registered RFID tag is not detected within a second period of time, the controller 7 changes a power supply mode of the electronic camera to a predetermined power saving mode in order to reduce power consumption. That is, the controller 7 controls driving power of the camera to change to a second driving power from a first driving power, in which the second driving power is lower than the first driving power.

The fist period of time may be the same as the second period of time, or may be different therefrom.

Thus, according to this embodiment, since the controller 7 changes the power supply mode of the electronic camera to the predetermined power saving mode in cases where, within the detection area of the RFID detector 12, the registered RFID tag is not detected within a predetermined period of time, the power consumption of the electronic camera can be reduced.

Sixth Exemplary Embodiment

Figure 7:
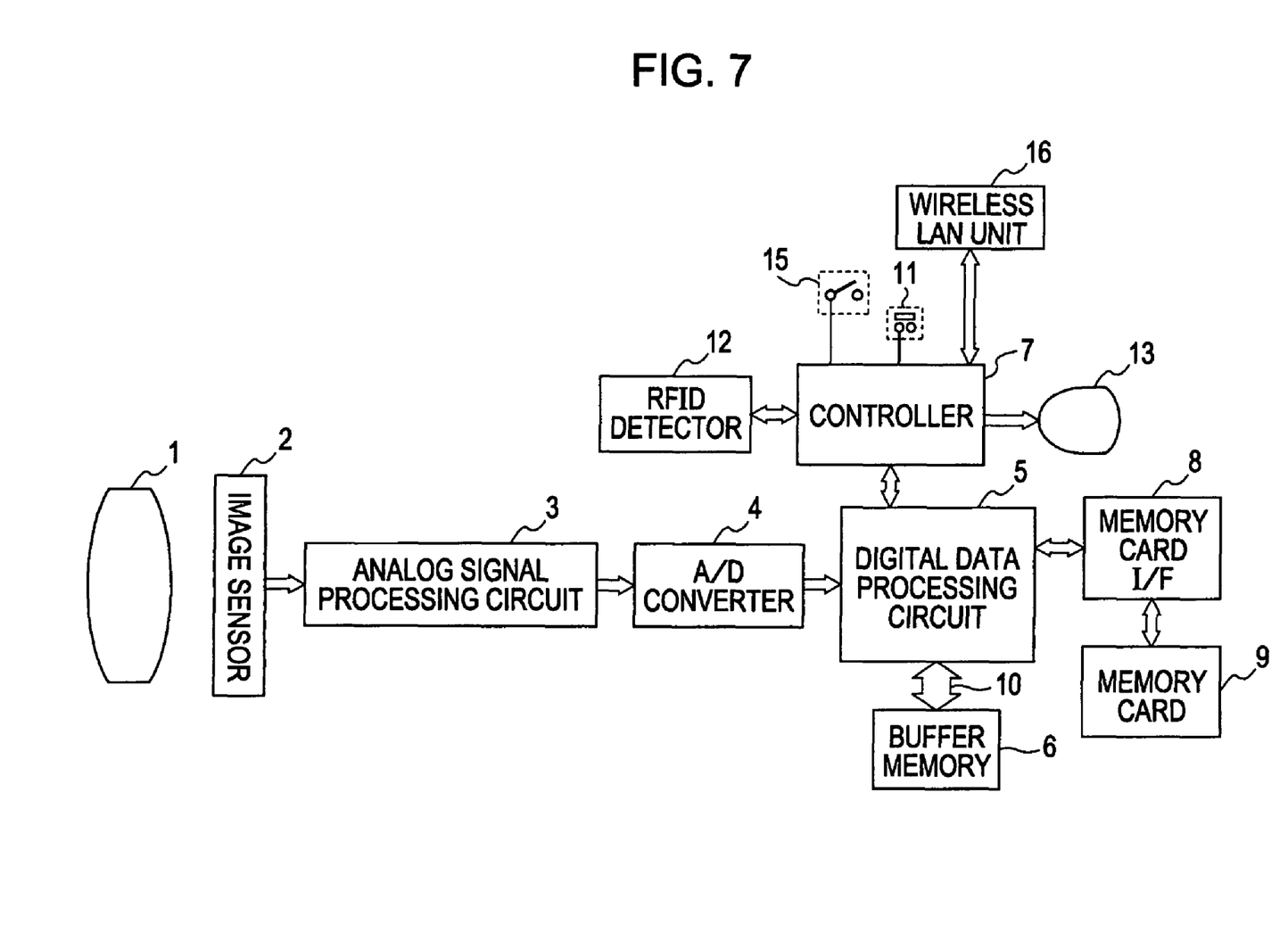
FIG. 7 is an exemplary block diagram illustrating an exemplary arrangement of an electronic camera in a sixth embodiment of the present invention.

FIG. 7 is an exemplary block diagram illustrating an exemplary arrangement of an electronic camera in the sixth embodiment of the present invention. Components of the fifth embodiment (shown in FIG. 7) that have the same or similar function as components of the first and fifth embodiment (shown in FIGS. 1 and 6, and described above) have the same reference number, and descriptions thereof are not repeated here. In FIG. 7, the electronic camera includes a wireless LAN unit 16.

An exemplary processing operation of the electronic camera is described below with reference to FIG. 6. The processing of photographing operation which starts with an operation of the shutter button 11 is the same as that of the first or forth embodiment (see the flowchart in FIG. 2 or FIG. 5).

When the power switch 15 is operated, the camera starts to work and the electric power is supplies to the RFID detector 12. Then, the RFID detector 12 detects whether there is any RFID tag within the detection area.

In cases where the RFID tag is detected within the detection area, it is determined whether the detected RFID tag is registered in the controller 7. In cases where the detected RFID tag is registered, the wireless LAN unit 16 is set by using wireless setting information stored in the detected RFID tag.

Thus, according to this embodiment, since the wireless LAN unit 16 is set by using the wireless setting data stored in the detected RFID tag in cases where the detected RFID tag is registered, the wireless LAN unit 16 can be set up easily for each specific area to be used.

Seventh Exemplary Embodiment

Figure 8:
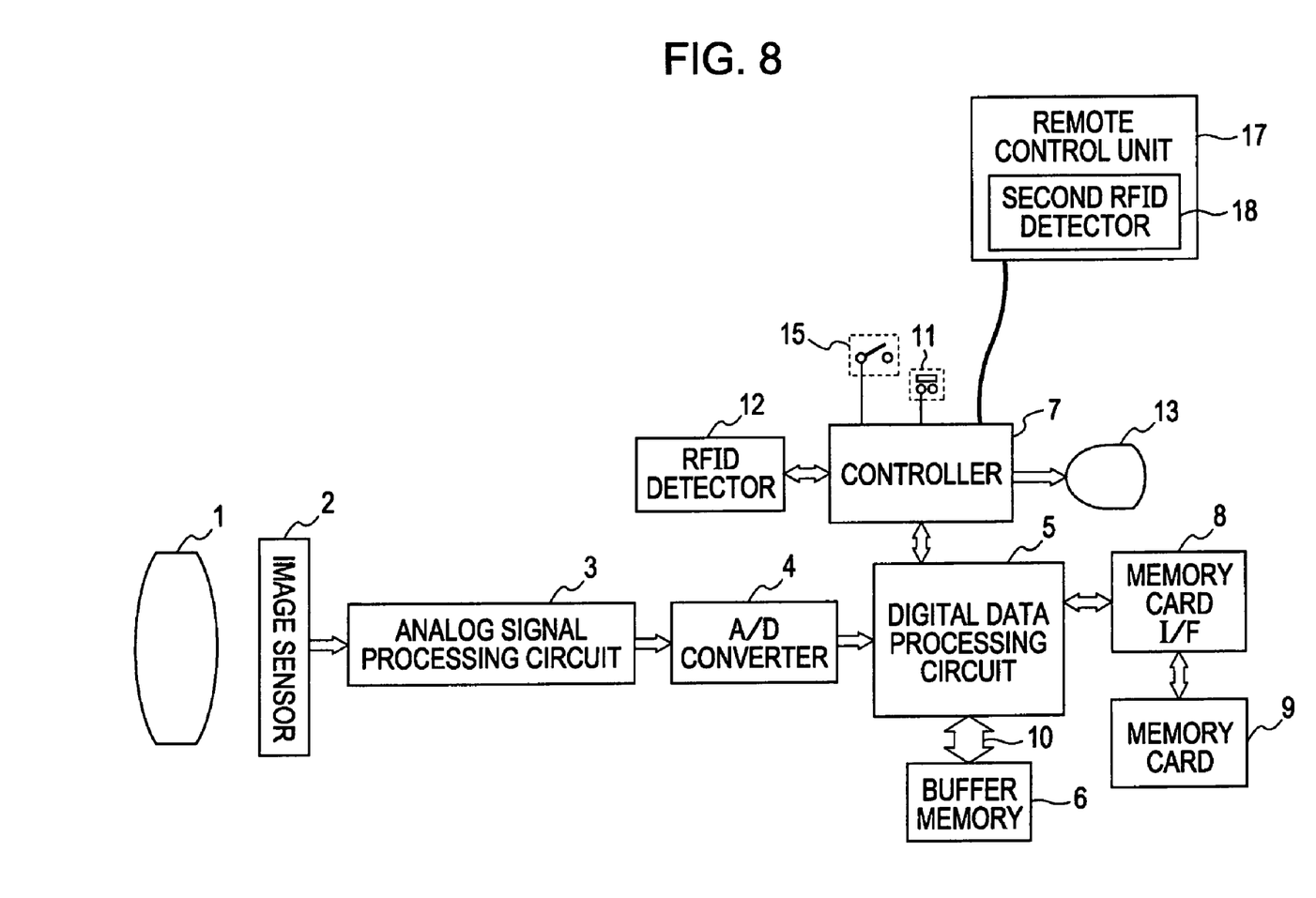
FIG. 8 is an exemplary block diagram illustrating an exemplary arrangement of an electronic camera in a seventh embodiment of the present invention.

FIG. 8 is an exemplary block diagram illustrating an exemplary arrangement of an electronic camera in the seventh embodiment of the present invention. Components of the seventh embodiment (shown in FIG. 8) that have the same or similar function as components of the first and fifth embodiment (shown in FIGS. 1 and 6, and described above) have the same reference number, and descriptions thereof are not repeated here. In FIG. 8, the electronic camera includes a wired remote control unit 17. The wired remote control unit 17 includes a RFID detector 18. The wired remote control unit 17 is connectable with the apparatus main body.

An exemplary processing operation of the electronic camera is described below with reference to FIG. 8.

When the shutter button 11 is operated, electric power source is supplied to the RFID detector 12. Then, the RFID detector 12 detects whether there is any RFID tag (not shown) within a predetermined detection area. Furthermore, in cases where the wired remote control unit 17 is connected to the body of the camera, the electric power is supplied to the second RFID detector 18 in the wired remote control unit 17. Then, the second RFID detector 18 also detects whether there is any RFID tag (not shown) within a predetermined detection area.

The RFID tag is preferably carried by the user. For example, the RFID tag may be built into an ID badge which the user can put on. In cases where the distance from which the RFID detector 12 or the RFID detector 18 can detect the RFID tag is several ten centimeters or less, for example, the RFID tag may be built into a wristband preferably worn on the dominant hand of the user which operates the shutter button 11 or the wired remote control unit 17. By carrying the RFID tag as described above, the RFID tag detection by the RFID detector 12 or the second RFID detector 18 can be performed with accuracy.

In cases where the RFID tag is detected, by the RFID detector 12 or the second RFID detector 18 within the detection area, it is determined whether the detected RFID tag is registered in the controller 7. In cases where the detected RFID tag is registered, photographing operation is stated. That is, the object image by which the image-formation is performed on the image sensor 2 with the lens 1 is converted into an electrical signal by the image sensor 2. The electrical signal obtained by the image sensor 2 is processed by the analog signal processing circuit 3. Then, the processed electrical signal is converted into digital data by the A/D converter 4.

The digital data converted by the A/D converter 4 is performed predetermined pre-process, and then the pre-processed digital data is temporarily stored in the buffer memory 6. The digital data is read from the buffer memory when the memory bus 10 is not busy. Then, the read digital data is predetermined developing-processed by the digital data processing circuit 5 to output digital image data. The digital image data is again stored in the buffer memory 6.

The digital image data stored in the buffer memory 6 is read with the memory card I/F 8, and is written in the memory card 9. Each above-described operation is suitably controlled by the controller 7.

Thus, according to this embodiment, since an accessory of the wired remote control unit etc. is also equipped with the RFID detector, the personal authentication can be performed even if the user is distance from the electronic camera.

Other Embodiments

Embodiments of the present invention can be applied to an apparatus consisting of a single device or to a system including a plurality of devices.

Furthermore, embodiments of the invention can be implemented by supplying a software program, which implements the functions of the foregoing embodiments, directly or indirectly to a system or apparatus, reading the supplied program code with a computer of the system or apparatus, and then executing the program code.

In this case, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-read-only memory), a CD-R (CD-recordable), a CD-RW (CD-rewritable), a magnetic tape, a non-volatile type memory card, a ROM, a DVD (digital versatile disk, e.g., a DVD-ROM and a DVD-R), and a Blu-ray Disc.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A central processing unit (CPU) or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Application No. 2005-188087, filed Jun. 28, 2005, which is hereby incorporated by reference herein.

What is claimed is:

1. An imaging apparatus comprising:
   an image capture unit that captures an image;
   a storage unit that stores image data corresponding to the captured image in a storage medium;
   a detection unit configured to detect a wireless ID device which is in a detection area; and
   a control unit that (a) changes a mode of the imaging apparatus to a power saving mode to reduce power consumption if the wireless ID device is not detected within a predetermined time, and (b) determines whether the detected wireless ID device is a registered device, wherein if the detected wireless ID device is the registered device, a wireless LAN unit coupled to the control unit is set using wireless setting information stored in the detected wireless ID device.

2. The imaging apparatus according to claim 1, wherein the control unit (a) enables the imaging apparatus to store the image data corresponding to the captured image in the storage medium if the detected wireless ID device is the registered device, and (b) disables the imaging apparatus from capturing an image if the detected wireless ID device is not the registered device.

3. The imaging apparatus according to claim 1, wherein the storage medium is detachable from the imaging apparatus.

4. The imaging apparatus according to claim 1, wherein the control unit enables the imaging apparatus to store the image data corresponding to the captured image in the storage medium if the detected wireless ID device is the registered device.

5. The imaging apparatus according to claim 1, wherein the control unit disables the imaging apparatus from capturing an image if the detected wireless ID device is not the registered device.

6. The imaging apparatus according to claim 1, wherein the imaging apparatus includes an electronic camera.

7. A method of controlling an imaging apparatus, the imaging apparatus including (a) an image capture unit that captures an image and (b) a storage unit that stores image data corresponding to the captured image in a storage medium, the method comprising:
   detecting, by a detection unit in the imaging apparatus, a wireless ID device which is in a detection area;
   changing a mode of the imaging apparatus to a power saving mode to reduce power consumption if the wireless ID device is not detected within a predetermined time; and
   determining, by a control unit in the imaging apparatus, whether the detected wireless ID device is a registered device, wherein if the detected wireless ID device is the registered device, a wireless LAN unit coupled to the control unit is set using wireless setting information stored in the detected wireless ID device.

8. The method according to claim 7, further comprising:
   enabling the imaging apparatus to store the image data corresponding to the captured image in the storage medium if the detected wireless ID device is the registered device; and
   disabling the imaging apparatus from capturing an image if the detected wireless ID device is not the registered device.

9. The method according to claim 7, wherein the storage medium is detachable from the imaging apparatus.

10. The method according to claim 7, further comprising enabling the imaging apparatus to store the image data corresponding to the captured image in the storage medium if the detected wireless ID device is the registered device.

11. The method according to claim 7, further comprising disabling the imaging apparatus from capturing an image if the detected wireless ID device is not the registered device.

12. The method according to claim 7, wherein the imaging apparatus includes an electronic camera.

* * * * *